US006882798B2

United States Patent
Uematsu et al.

(10) Patent No.: US 6,882,798 B2
(45) Date of Patent: Apr. 19, 2005

(54) OPTICAL TRANSMISSION APPARATUS WITH AN OPTIMAL ROUTING AND DATA TRANSMITTING CAPABILITY AND A METHOD OF DETERMINING AN OPTIMAL ROUTE ON OPTICAL TRANSMISSION

(75) Inventors: Kiyoshi Uematsu, Saitama (JP); Manabu Wakabayashi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 657 days.

(21) Appl. No.: 10/035,227

(22) Filed: Jan. 4, 2002

(65) Prior Publication Data

US 2002/0126337 A1 Sep. 12, 2002

(30) Foreign Application Priority Data

Mar. 1, 2001 (JP) ....................................... 2001-056266

(51) Int. Cl.[7] .............................................. H04B 10/08
(52) U.S. Cl. .............................. 398/26; 398/27; 398/57
(58) Field of Search ............................. 398/49, 26, 57, 398/27, 34, 25

(56) References Cited

U.S. PATENT DOCUMENTS 5,914,798 A * 6/1999 Liu ................................ 398/7
5,949,560 A * 9/1999 Roberts et al. ................ 398/29
6,219,161 B1 * 4/2001 Chang et al. .................. 398/79

* cited by examiner

Primary Examiner—Jason Chan
Assistant Examiner—Christina Y. Leung
(74) Attorney, Agent, or Firm—Venable LLP; Michael A. Sartori

(57) ABSTRACT

An optical transmission apparatus implemented as an OADM (Optical Add/Drop Multiplexer) includes quality monitors each for monitoring the quality of a signal arriving on a particular optical transmission path. A monitor/control unit converts quality signals output from the quality monitors to path-by-path bit error rates, or estimation values, and compares them to select a route. The monitor/control unit then generates a metric value "1" for the route selected and adds it to one of identical metric values, which are assigned to routes to the same destination, that corresponds to the route selected. The monitor/control unit can therefore select a route closer to actual transmission path conditions. A method of determining an optimal route for optical transfer is also disclosed.

7 Claims, 6 Drawing Sheets

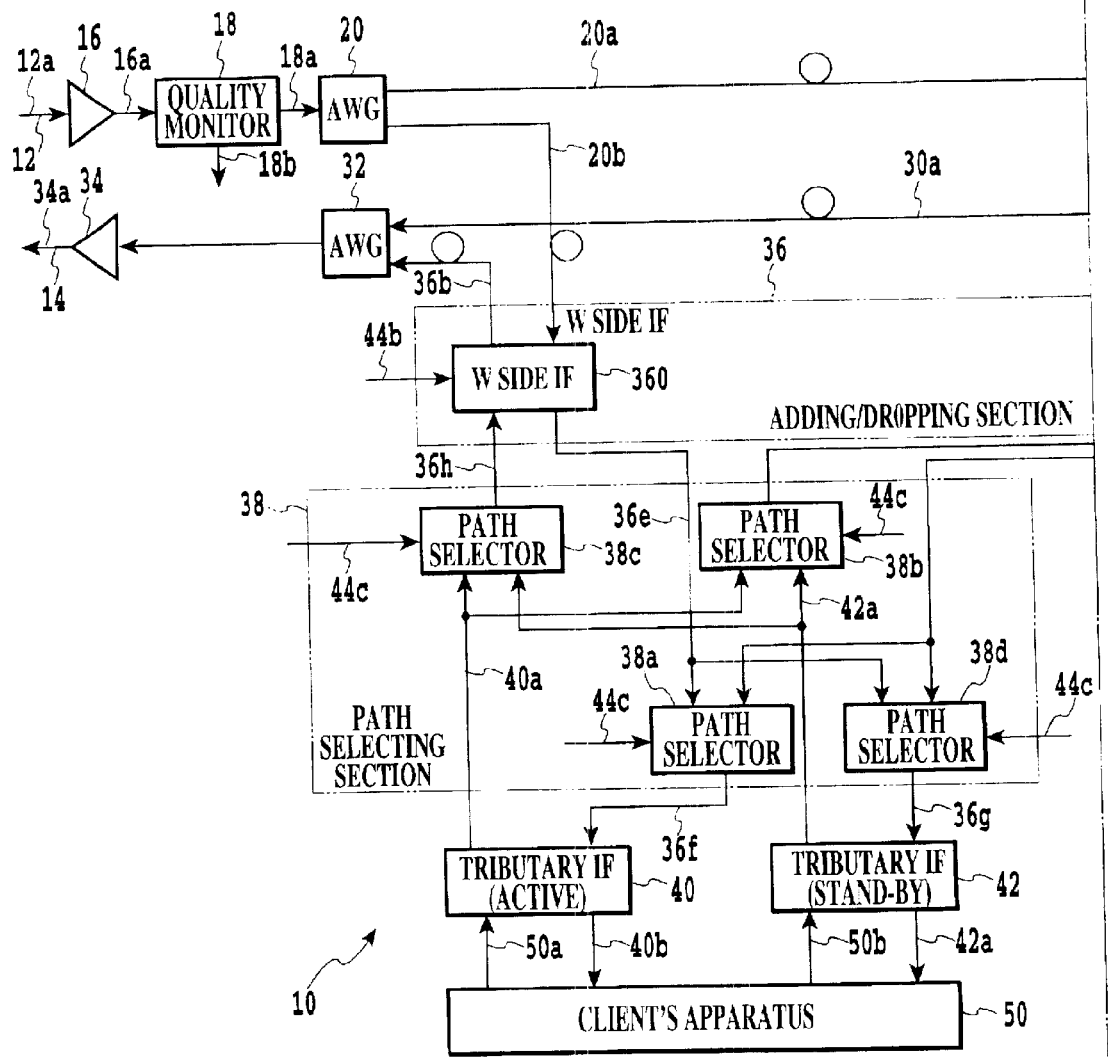

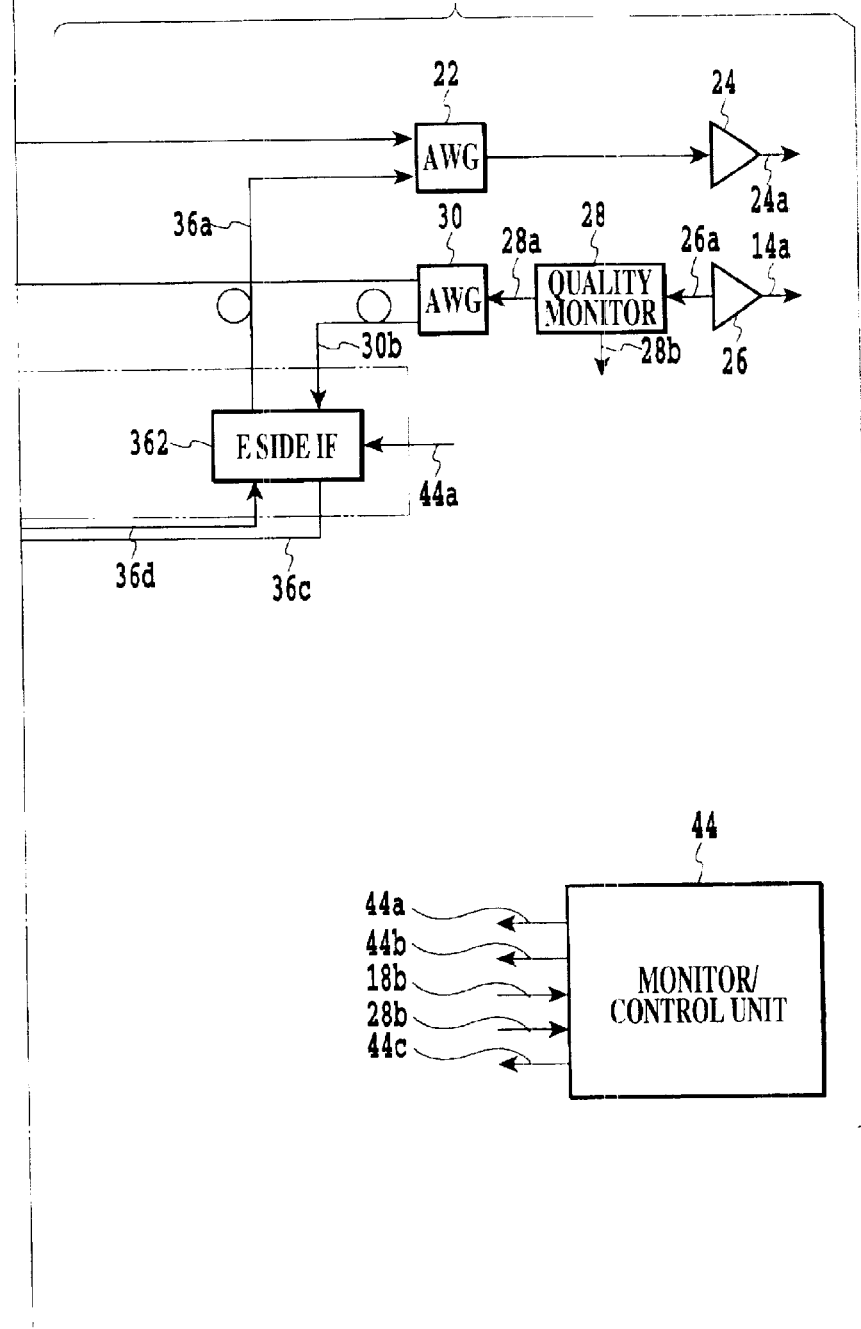

OPTICAL TRANSMISSION APPARATUS WITH AN OPTIMAL ROUTING AND DATA TRANSMITTING CAPABILITY AND A METHOD OF DETERMINING AN OPTIMAL ROUTE ON OPTICAL TRANSMISSION

BACKGROUND OF THE INVENTION

1. Field of the Invention

The present invention relates to an optical transmission apparatus and a method of determining an optimal optical transmission route advantageously applicable to the routing system of, among various communication apparatuses, an optical transmission apparatus.

2. Description of the Background Art

Networks in general include a ladder type network and a ring type network. A ring type network includes ADMs (Add/Drop Multiplexers) for multiplexing optical signals to be output to ring transmission paths and demultiplexing optical signals input from the transmission paths. ADMs using optical fiber cables as the ring transmission paths are referred to as OADMs (Optical ADMs). An OADM differs from an ADM in that it has a bridging or through function between two transmission paths in addition to a multiplexing and demultiplexing function. Further, an OADM has a function of selecting a route along which a signal should be transmitted.

It is a common practice with an OADM to execute route selection mentioned above by default setting based on an APS (Automatic Protection Switching) system or by a software strap effected before installation or from a remote site. This kind of route selection has actually been applied to a SONET/SDH (Synchronous Optical NETwork/Synchronous Digital Hierarchy) ring that implements an economical digital network.

A routing protocol prescribed by the IETF (Internet Engineering Task Force) standard is another implementation available for route selection. It has been proposed to apply this routing protocol to the selection of the transmission route of an optical transmission apparatus in such a manner as to automatically find out an optimal transmission path. The above routing protocol is RIP/OSPF (Routing Information Protocol/Open Shortest Path First).

To set up a route from one client's apparatus to another client's apparatus with the routing protocol, each optical transmission apparatus reports its link state, or connect information, to the entire network. The client's apparatuses transfer information of the link states among them to thereby establish a topological database. Each transmission apparatus determines an optimal route by using the routing protocol by referencing the topological database. In practice, a metric, which is a parameter to be set by a user, is used for determining an optimal route. Typical of metrics is the number of hops between optical transmission apparatuses that are respectively connected to a source and a destination. The number of hops is representative of the number of optical transmission apparatuses which IP (Internet Protocol) packets are expected to pass. Usually, one rout including a smaller number of hops than the other routes is determined to be an optimal route.

It sometimes occurs that a plurality of routes including the same number of optical transmission apparatuses, which correspond to nodes, are selected as optimal routes. All of such routes satisfy the above-described optimal route condition and are therefore expected to be shortest. In practice, however, route selection depends on conditions other than the number of hops as well. For example, the length of a transmission path between central offices differs from one route to another route. Further, some nodes execute repeating while other nodes do not. Moreover, an error correcting function referred to as FEC (Forward Error Correction) is used to improve the bit error rate of information, as the case may be. When such route conditions other than the number of hops are taken into account, a transmission distance and an actual transmission ability are not always consistent with each other. Consequently, the routes including the same number of hops sometimes noticeably differ in actual transmission conditions from each other.

SUMMARY OF THE INVENTION

It is an object of the present invention to provide an optical transmission apparatus capable of selecting a route closer to the conditions of an actual route, and a method of determining an optimal optical transmission route.

In accordance with the present invention, an optical transmission apparatus selects, based on a first metric representative of a criterion for decision, an optical transmission route to a desired destination on a network for thereby transmitting information to the desired destination. For this purpose, a plurality of quality monitors each monitor the quality of a signal, which carries the information and arrives on a particular optical transmission path, immediately before the signal is input. A monitor/control unit converts first data being monitored to second data in accordance with the conditions of each optical transmission path and compares the second data selectively fed thereto path by path to thereby select a route. The monitor/control unit then generates a second metric for the route selected, adds it to the first metric of, among a plurality of optical transmission paths having the same metric value, an optical transmission path corresponding to the route selected to thereby control the delivery of information. In addition, the monitor/control unit controls an error correcting function relating to the optical transmission path. A path selecting circuit selects one of signals fed thereto in accordance with control over the error correcting function.

Also, in accordance with the present invention, a method of determining an optimal route for optical transmission selects, based on a first metric representative of a criterion for decision, an optical transmission route to a desired destination on a network for thereby transmitting information to the destination. Specifically, the quality of a signal, which carries the information and arrives on a particular optical transmission path, is monitored immediately before the signal is input to thereby output first data being monitored. When the first data output path by path is converted to second data representative of a transmission ability, the signal input is directly output as third data. When the first data output path by path is converted to the second data, error correction is executed with the signal input to thereby output fourth data. Either one of the third data and the fourth data output path by path is selected in accordance with control over a path-by-path error correcting function. The third data and fourth data are compared to select a route in accordance with the result of comparison. A second metric for the route is generated. Subsequently, when an optimal route to the destination is read out of routing information preselected in accordance with a preselected rule, metrics having the same first metric value are determined. When metrics having the same first metric value exist, the first metric corresponding to the path selected is added to the second metric to thereby output a third metric. Switching information for switching the path is generated in response to the routing information corresponding to the third metric. Thereafter, an error correcting function is controlled path by path.

BRIEF DESCRIPTION OF THE DRAWINGS

The objects and features of the present invention will become more apparent from consideration of the following detailed description taken in conjunction with the accompanying drawings in which:

FIG. 1 shows how FIGS. 1A and 1B are combined;

FIGS. 1A and 1B are block diagrams schematically showing an optical transmission apparatus embodying the present invention and implemented as an OADM;

DESCRIPTION OF THE PREFERRED EMBODIMENT

Figure 2:
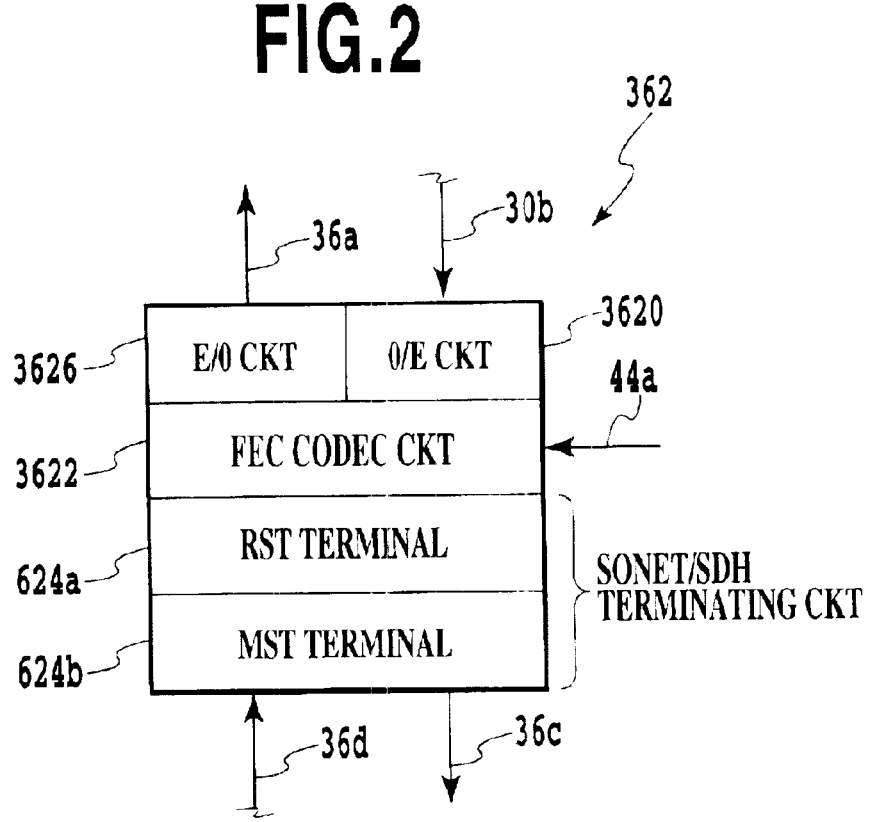
FIG. 2 is a schematic block diagram showing a specific configuration of an E (East) side interface included in the illustrative embodiment.

Referring to FIGS. 1A and 1B, an optical transmission apparatus embodying the present invention is shown and implemented as an OADM by way of example. In FIGS. 1A and 1B, part of the OADM not relevant to the understanding of the illustrative embodiment is not shown. Signals are designated by reference numerals attached to connect lines on which they appear.

As shown in FIGS. 1A and 1B, the OADM, generally 10, is connected to ring type, bidirectional communication paths. In the illustrative embodiment, the communication paths are implemented by an inner ring 12 and an outer ring 14 constituted by respective optical fiber cables. FIGS. 1A and 1B show part of such a ring type network.

The OADM 10 includes an optical input amplifier 16, a quality monitor 18, AWGs (Arrayed Waveguide Gratings) 20 and 22, and an optical output amplifier 24 that are allocated to the inner ring 12. An optical input amplifier 26, a quality monitor 28, AWGs 30 and 32 and an optical output amplifier 34 are allocated to the outer ring 14. An adding/dropping section 36, a path selecting section 38 and tributary IFs (Interfaces) 40 and 42 are connected between the AWGs 20 and 22 and between AWGs the 30 and 32. The tributary IFs 40 and 42 are identical in configuration and serve as an active IF and a stand-by IF, respectively. A monitor/control unit 44 controls the operation of the entire OADM 10. The OADM 10 interchanges information with a client's apparatus 50.

The optical input amplifiers 16 and 26 are variable gain pre-amplifiers for amplifying input, optical multiplexed signals 12a and 14a, respectively. The optical output amplifiers 24 and 34 are variable gain post-amplifiers for amplifying optical multiplexed signals subjected to a dropping, adding or through processing, thereby outputting optical multiplexed signals 24a and 34a, respectively. It is to be noted that an optical multiplexed signal refers to optically multiplexed lights.

The quality monitors 18 and 28 each calculate a Q factor or an Optical Signal-to-Noise Ratio (OSNR) out of the input, optical multiplexed signal for each optical transmission path or wavelength. The Q factor or the OSNR is representative of the transmission quality of the optical multiplexed signal. More specifically, the quality monitor 18 transfers an optical multiplexed signal 16a output from the input amplifier 16 to the AWG 20 as an optical multiplexed signal 18a. At the same time, the quality monitor 18 produces a wavelength-by-wavelength quality signal 18b from part of the multiplexed signal 16a and delivers the signal 18b to the monitor/control unit 44, although not shown specifically. Likewise, the quality monitor 28 transfers an optical multiplexed signal 26a output from the input amplifier 26 to the AWG 30 as an optical multiplexed signal 28a. In addition, the quality monitor 28 produces a wavelength-by-wavelength quality signal 28b from part of the multiplexed signal 26a and delivers the signal 28b to the monitor/control unit 44.

As for the inner ring, the AWG 20 transfers the multiplexed signal 18a output from the quality monitor 18 to the AWG 22 via an optical fiber cable 20a (bridging or through function). Further, the AWG 20 demultiplexes the multiplexed signal 18a on a wavelength basis and feeds the demultiplexed signal 20b to the adding/dropping section 36 (demultiplexing function). The AWG 30 also has the bridging function and demultiplexing function except that it deals with the outer ring 14. Specifically, the AWG 30 is connected to the AWG 32 by an optical fiber cable 30a and connected to the adding/dropping section 36 by an optical fiber cable 30b. A system controller, not shown, or the monitor/control unit 44 causes each of the AWGs 20 and 30 to selectively execute bridging or demultiplexing, as needed.

The AWG 22 assigned to the inner ring 12 receives a wavelength-by-wavelength optical signal 36a output from the adding/dropping section 36 in addition to an optical multiplexed signal 20a output from the AWG 20. The AWG 22 multiplexes the two signals 36a and 20a. Likewise, the AWG 32 assigned to the outer ring 14 receives a wavelength-by-wavelength optical signal 36b output from the adding/dropping section 36 in addition to an optical multiplexed signal 30a output from the AWG 30. The AWG 32 multiplexes the two signals 36b and 30a.

As shown in FIGS. 1A and 1B, the adding/dropping section 36 is made up of a W (West) side IF 360 and an E (East) side IF 362, which are identical in configuration with each other. FIG. 2 shows a specific configuration of the E side IF 362 by way of example. As shown, the E side IF 362 includes an O/E (Optical-to-Electric) circuit 3620, an FEC Codec circuit 3622, a SONET/SDH terminating circuit 3624, and an E/O (Electric-to-Optical) circuit 3626.

The O/E circuit 3620 converts the demultiplexed, wavelength-by-wavelength signal 30b to a corresponding electric signal. The O/E circuit 3620 includes a pin photodiode or similar photosensitive device as well as a front-end amplifier, although not shown specifically. The front-end amplifier uses a transimpedance type circuit, which is inherently low in noise and broad in bandwidth.

The FEC Codec circuit 3622 executes modulation or demodulation (coding or decoding) in response to a control signal 44a fed from the monitor/control unit 44, while executing forward error correction. For this purpose, the FEC Codec circuit 3622 may use Reed-Solomon codes. More specifically, the FEC Codec circuit 3622 decodes an electric signal output from the O/E circuit 3620 for thereby producing an NRZ (Non-Return-to-Zero) code and delivers the NRZ code to the SONET/SDH terminating circuit 3624. Also, the FEC Codec circuit 3622 codes a signal input from the SONET/SDH terminating circuit 3624 and feeds the resulting code to the E/O circuit 3626 as data to be sent.

As shown in FIG. 1A, the monitor/control unit 44 (FIG. 1B) delivers a control signal 44b to an FEC Codec circuit, not shown, included in the W side IF 360.

As shown in FIG. 2, the SONET/SDH terminating circuit 3624 is made up of an RST (Re-generation Section Termination) terminal 624a and a MST (Multiplex Section Termination) terminal 624b. The SONET/SDH terminating circuit 3624 delivers received data, or output signal, 36c to the path selecting section 38, FIG. 1A. At this instant, the terminating circuit 3624 detects and removes a SOH (Section Over-Head). Further, the circuit 3624 inserts an SOH when generating a SONET/SDH frame on the receipt of data 36d to be sent, or input signal, from the path selecting section 38.

The E/O circuit 3626 transforms an electric signal output from the FEC Codec circuit 3622 to a corresponding optical signal. The E/O circuit 3626 includes a semiconductor laser, LED (Light Emitting Diode) or similar light emitting device having a low noise, single mode characteristic and coherency. The E/O circuit 3626 additionally includes, e.g., an ATC (Automatic Temperature Control) circuit, an APC (Automatic Power Control) circuit, an optical external modulator, a driver for driving the external modulator, and a bias control circuit, although not shown specifically.

Referring again to FIG. 1A, the path selecting section 38 includes a plurality of (four in the illustrative embodiments) path selectors 38a through 38d each having two inputs and one output. The monitor/control unit 44 feeds switching information 44c to the path selectors 38a through 38d in order to switch a path. It is to be noted that the path selector 38d is a stand-by path selector.

More specifically, the path selector 38a receives the received data 36c from the E side IF 362, FIG. 2, and receives received data 36e from the W side IF 360. The path selector 38a selects either one of the received data 36c and 36e in response to the switching information 44c and feeds it to the active tributary IF 40 as received data 36f. The stand-by path selector 38d also receives the received data 36c and 36e and selectively delivers one of them to the stand-by tributary IF 42 as received data 36g. The path selectors 38b and 38c each receive both of data 40a and 42a to be sent, which are output from the active tributary IF 40 and stand-by tributary IF 42, respectively. The path selectors 38b and 38c, which are active/stand-by selectors, respectively output data 36d and 36h to be sent selected in response to the switching information 44c to the E side IF 362 and W side IF 360, respectively.

Figure 3:
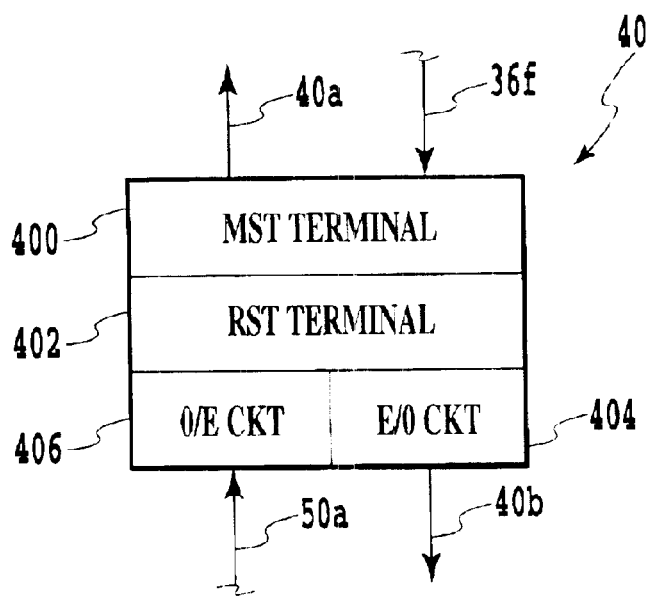
FIG. 3 is a schematic block diagram showing a specific configuration of a tributary interface also included in the illustrative embodiment.

FIG. 3 shows a specific configuration of the active tributary IF 40. As shown, the tributary IF 40 includes an MST terminal 400, an RST terminal 402, an E/O circuit 404 and an O/E circuit 406. The tributary IF 40 has the same configuration as the E side IF 362, FIG. 2, except that it lacks the FEC Codec circuit 3622. An optical signal 50a is input from the client's apparatus 50 to the tributary IF 40. The stand-by tributary IF 42, which is identical in configuration with the active tributary IF 40, is capable of feeding an optical signal 42a to the client's apparatus 50 while receiving the optical signal 50b from the apparatus 50.

Figure 4:
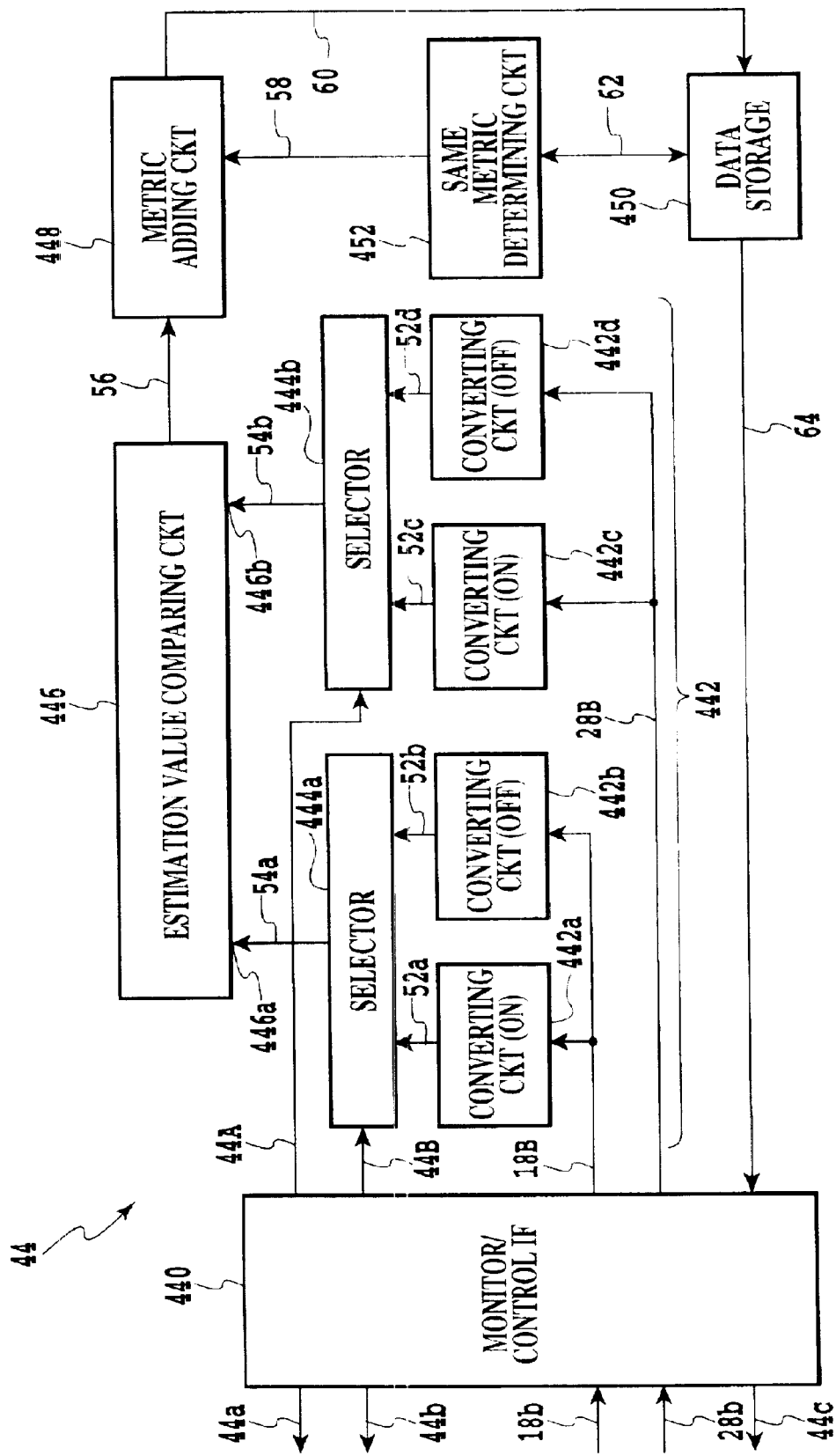
FIG. 4 is a schematic block diagram showing a specific configuration of a monitor/control unit further included in the illustrative embodiment.

Reference will be made to FIG. 4 for describing a specific configuration of the monitor/control unit 44. As shown, the monitor/control unit 44 is generally made up of a monitor/control IF 440, an estimation value outputting section 442, selectors 444a and 444b, an estimation value comparing circuit 446, a metric adding circuit 448, a data storage 450, and a same metric determining circuit 452.

The quality signals 18b and 28b output from the quality monitors 18 and 28, FIGS. 1A and 1B, are input to the monitor/control IF 440. The control signals 44a and 44b and switching information 44c are output from the monitor/control IF 440. The monitor/control IF 440 inputs the quality signals 18b and 28b to the estimation value outputting section 442 in the form of quality signals 18B and 28B each corresponding to a particular path. Further, the monitor/control IF 440 generates the control signals 44a and 44b for controlling the FEC Codec circuit 3622, FIG. 2, of the E side IF 362 and that of the W side IF 360 (FIG. 1A), respectively. In addition, the monitor/control IF 440 feeds switching signals 44A and 44B to the selectors 444b and 444a, respectively, while associating them with the control signals 44a and 44b, respectively. The switching signals 44A and 44B respectively cause the selectors 444b and 444a to select either one of two different data input thereto.

The estimation value outputting section 442 estimates two paths with four converting circuits 442a through 442d. The converting circuits 442a and 442b are assigned to one path while the converting circuits 442c and 442d are assigned to the other path. The quality signals 18B and 28B output from the monitor/control IF 440 are input to the converting circuits 442a and 442b and converting circuits 442c and 442d, respectively. The converting circuits 442a through 442d each are implemented as a lookup table for converting the input quality signal 18B or 28B to an estimation value. The illustrative embodiment uses a bit error rate as an evaluation value.

The converting circuits 442a and 442c each store bit error rates expected to occur in the ON state of the FEC Codec function, i.e., when the FEC Codec function is used. Likewise, the converting circuits 442b and 442d each store bit error rates expected to occur in the OFF state of the FEC Codec function, i.e., when the FEC Codec function is not used. More specifically, the converting circuits 442a and 442b and converting circuits 442c and 442d are assigned to the inner ring 12 and outer ring 14, respectively.

The converting circuit 442a feeds to the selector 444a a bit error rate 52a occurred in the ON state of the FEC Codec function, which corresponds to the quality signal 18B. The converting circuit 442b feeds to the selector 444a a bit error rate 52b occurred in the OFF state FEC Codec function, which also corresponds to the quality signal 18B. On the other hand, the converting circuits 442c and 442d respectively feed to the selector 444b a bit error rate 52c occurred in the ON state of the FEC Codec function, which corresponds to the quality signal 28B, and a bit error rate 52d occurred in the OFF state of the same, which also corresponds to the quality signal 28B.

Figure 5:
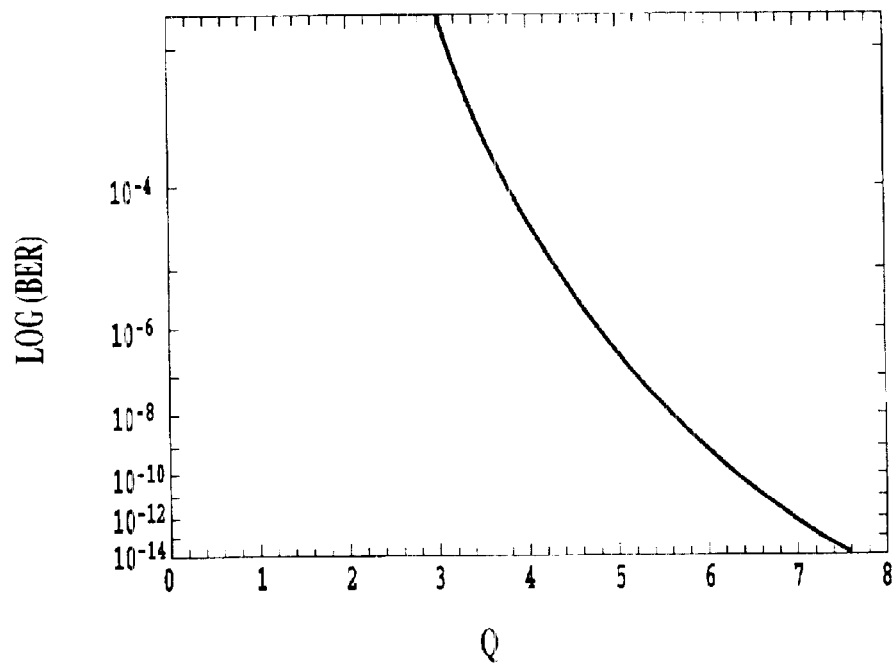
FIG. 5 is a graph showing a relation between a Q factor and a bit error rate in the monitor/control unit of FIG. 4.
Figure 6:
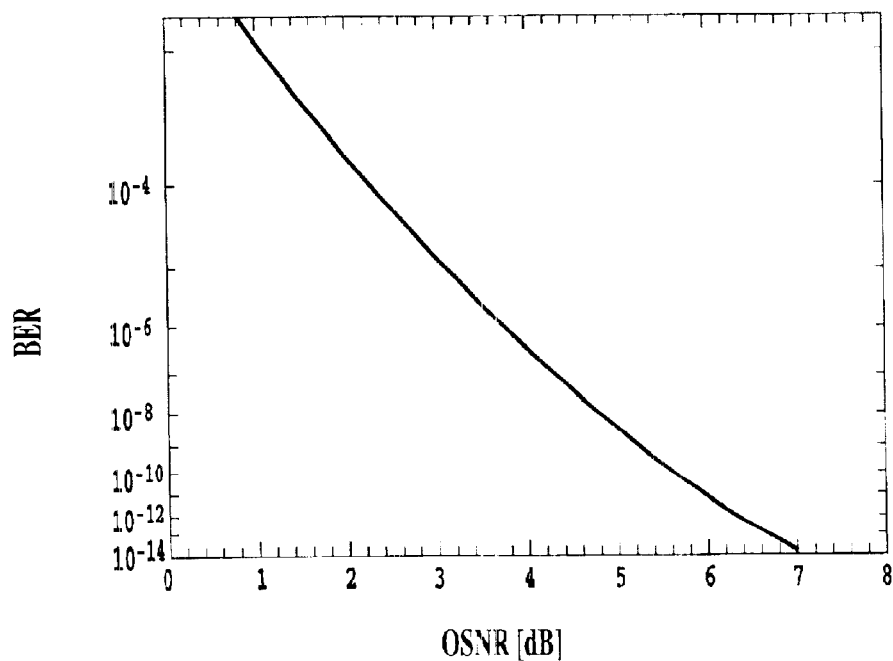
FIG. 6 is a graph showing a relation between an optical signal-to-noise ratio and a bit error rate in the monitor/control unit of FIG. 4.

FIGS. 5 and 6 are graphs showing a relation between the quality signal and the bit error rate. In FIG. 5, the ordinate and abscissa indicate a Bit Error Rate (LOG (BER)) and a Q factor, respectively. In FIG. 6, the ordinate and abscissa indicate, a Bit Error Rate (BER) and an OSNR, respectively. AS FIGS. 5 and 6 indicate, the bit error rate decreases with an increase in Q factor and an increase in OSNR. Further, a relation of the output value to the input value responds more sharply to Q factor than to OSNR.

Referring again to FIG. 4, the selector 444a selects one of the bit error rates or estimation values 52a and 52b in response to the switching signal 44B. The selector 444a feeds the bit error rate 52a or 52b selected to one input 446a of the evaluation value comparing circuit 446 as an estimation value 54a. Likewise, the selector 444b selects one of the bit error rates or estimation values 52c and 52d in response to the switching signal 44A and feeds it to the other input 446b of the comparing circuit 446 as an estimation value 54b.

The estimation value comparing circuit 446 compares the estimation values 54a and 54b each corresponding to a particular path. The comparing circuit 446 then selects one of the two paths in accordance with the result of comparison and generates a new metric value for the path selected. In this manner, the comparing circuit 446 determines a path with a higher estimation value, i.e., a smaller bit error rate by comparison. The comparing circuit 446 reports a new metric value "1" assigned to the path selected to the metric adding circuit 448 in the form of a signal 56.

The metric adding circuit 448 receives metric values 58 output from the same metric determining circuit 452 in addition to the metric value 56 output from the estimation value comparing circuit 446. Assume that some of the metric values (cost values) 58 output from the same metric determining circuit 452 are equal to each other. Then, the metric adding circuit 448 adds the metric value 56 to one of the same metric values 58 that is assigned to the path selected. The metric adding circuit 448 delivers the resulting sum metric value 60 to the data storage 450.

The data storage 450 stores, e.g., a link state algorithm or routing procedure and a routing table, not shown, that lists connect information. On receiving information representative of a destination, the data storage 450 selects adequate connect information 62 out of the routing table and feeds it to the same metric determining circuit 452. The data storage 450 updates the routing table in accordance with the sum metric value 60 output from the metric adding circuit 448 or the metric value 62 output from the same metric determining circuit 452. The data storage 450 then delivers updated routing information 64 to the monitor/control IF 440. The monitor/control IF 440 converts the routing information 64 to the switching information 44c.

The same metric determining circuit 452 filters the metric values 62 output from data storage 450 in order to find the smallest metric value. In addition, the determining circuit 452 determines whether or not the same metric values exist. If metric values equal to each other exist, then the determining circuit 452 delivers the metric value 58 to the metric adding circuit 458. If such metric values do not exist, then the determining circuit 452 returns the smallest metric value 62 found with its filtering function to the data storage 450. If desired, a signal representative of a failure of decision on the same metric values may be written to the data storage 450 in place of the metric value 62 itself.

The illustrative embodiment is implemented as an OADM system applicable to a ring type network, as stated above. Assume that the number of optical transmission paths is increased. Then, the illustrative embodiment is similarly applicable to an optical cross-connect system included in a mesh type network if a greater number of bit error rates are input to the estimation value comparing circuit 446.

The operation of the OADM system 10 will be described hereinafter. The OADM system 10 optically transfers information from the W side to the E side via the inner ring 12 and optically transfers information from the E side to the W side via the outer ring 14. On the optical transfer paths of the inner ring 12 and outer ring 14, the optical multiplexed signals 12a and 14a, respectively, are transferred. The optical input amplifiers 16 and 26 amplify the multiplexed signals 12a and 14a, respectively, and deliver the amplified signals 16a and 28a to the quality monitors 18 and 28.

The quality monitors 18 and 28 feed the multiplexed signals 16a and 26a to the AWGs 20 and 30, respectively. At the same time, the quality monitors 18 and 28 respectively generate the wavelength-by-wavelength or path-by-path quality signals 18b and 28b on the basis of the multiplexed signals 16a and 26a. The quality signals 18b and 28b are implemented as, e.g., Q factors or OSNRs and fed to the monitor/control unit 44.

The AWG 20 simply passes the multiplexed signal 18a therethrough to the AWG 22 via the optical fiber cable 20a or demultiplexes the signal 18a on a wavelength basis. The resulting wavelength-by-wavelength signal 20b is delivered to the W side IF 360 via a plurality of optical transfer paths. The other AWG 30 operates in the same manner as the AWG 20 except that it deals with the optical multiplexed signal 28a and delivers the demultiplexed signal 30b to the E side IF 362.

The W side IF 360 and E side IF 362 respectively convert the wavelength-by-wavelength optical signals 20b and 30b input thereto to corresponding electric signals. The IFs 360 and 362 then execute FEC decoding with the wavelength-by-wavelength electric signals under the control of the monitor/control unit 44, thereby producing NRZ codes. Further, the IFs 360 and 362 remove SONET/SDH overheads from the decoded data when terminating the decoded data. The data terminated by the IFs 360 and 362 are fed to the pass selecting section 38.

In the pass selecting section 38, the path selector 38a selects either one of the received data 36c and 36e output from the W side IF 360 and E side IF 362 in response to the switching signal 44c output from the monitor/control unit 44. The path selector 38a then delivers the received data selected to the tributary IF 40 as received data 36f. The tributary IF 40 sends the received data 36f to the client's apparatus 50 in the form of an optical signal 40b. The procedure described so far is a dropping function unique to the OADM 10.

An adding function also unique to the OADM 10 will be described hereinafter. As for the adding function, the client's equipment 50 may be either one of an active apparatus and a stand-by apparatus. An optical signal 50a or 50b sent from the client's apparatus 50 is input to the active and stand-by tributary IFs 40 and 42. The tributary IFs 40 and 42 each convert the optical signal 50a or 50b to a corresponding electric signal and delivers the electric signal to both of the path selectors 38b and 38c as data to be transmitted 42a or 40a. The path selectors 38b and 38c each select the data 42a or 40a in response to the switching information 44c. The path selectors 38b and 38c respectively deliver the data selected to the E side IF 362 and W side IF 360 as data to be transmitted 36d and 36h.

The SONET/SDH terminating circuit 3624 included in each of the E side IF 360 and W side IF 362 generates a SONET/SDH frame while adding an SOH to the frame. Further, in each of the two IFs 360 and 362, the FEC Codec circuit 3622 codes the data to be transmitted in response to the control signal 44b or 44a. Subsequently, the E/O circuit 3626 executes electric-to-optical conversion with the coded data wavelength by wavelength, i.e., path by path, thereby outputting a path-by-path optical signal 36b or 36a. The AWGs 22 and 32 respectively multiplex the optical signals 36b and 36a and respectively send the resulting multiplexed signals to desired destinations via the output amplifiers 34 and 24, which are respectively assigned to the outer ring 14 and inner ring 12.

Figure 7:
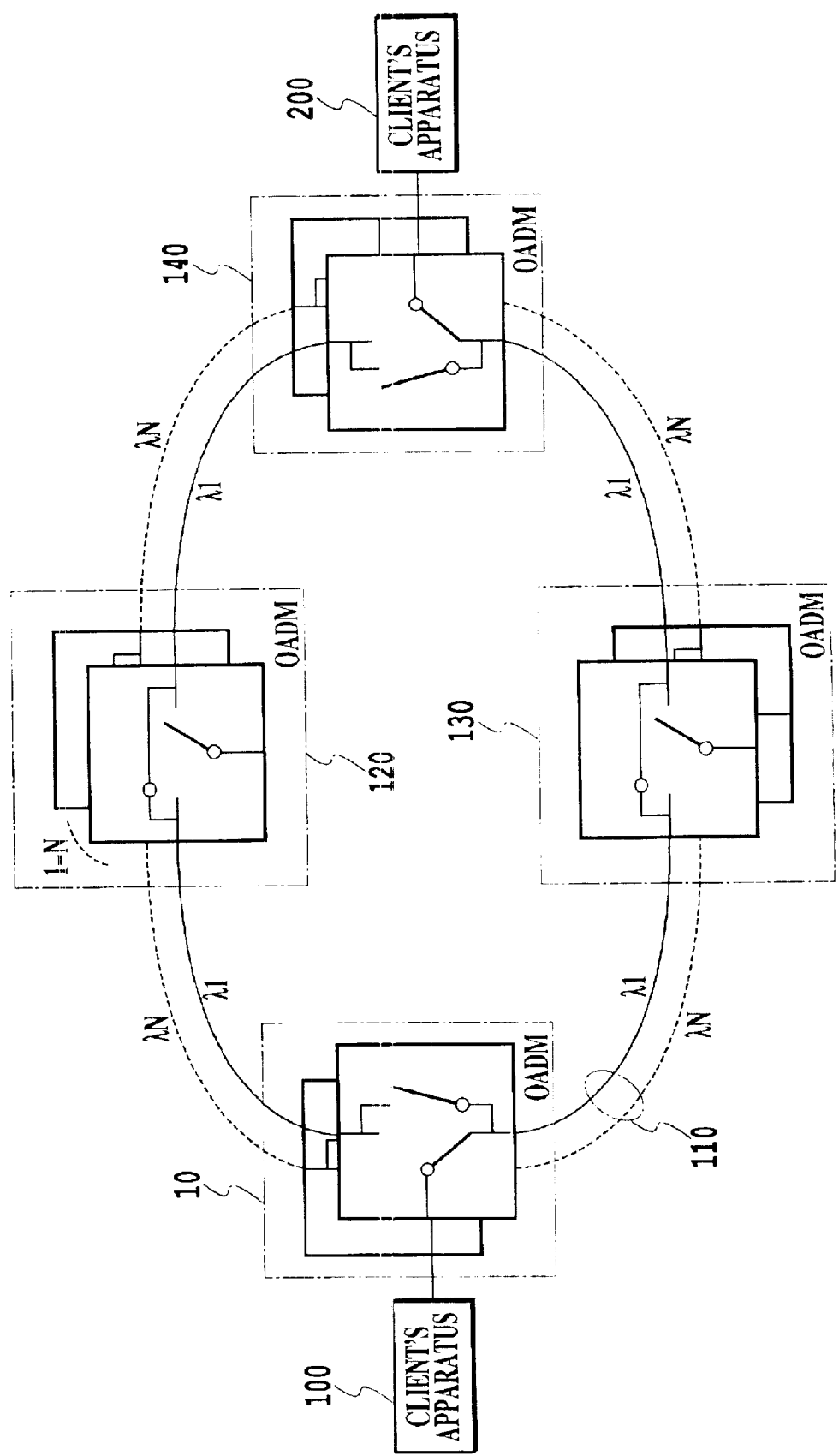
FIG. 7 is a schematic view for describing how an optical transmission path is selected.

FIG. 7 shows a specific ring type network 110 including clients' apparatuses 100 and 200 and OADMs 10, 120, 130 and 140 each having the above-described configuration. The clients' apparatuses 100 and 200 are connected to the OADMs 10 and 140, respectively. Optical fiber cables, not shown, are laid on the transfer paths of the network 110. The OADMs 10, 120, 130 and 140 each deal with an optical signal in which lights of N different wavelengths λ1 through λN are multiplexed together.

In FIG. 7, assume that an optical signal is sent from the client's apparatus 100 to the client's apparatus 200 over the network 110. Then, two different transfer routes are available, i.e., one extending from the client's apparatus 100 to the client's apparatus 200 via the OADMs 10, 120 and 140 and the other extending from the apparatus 100 to the apparatus 200 via the OADMs 10, 130 and 140. The two routes both include two hops and both are shortest. It is therefore expected that both of the two routes implement optimal optical signal transmission. In practice, however, the transmission distance of the shortest route depends not only on the number of hops but also on a geographical condition in actual location (transmission distance), presence/absence of repeating, improvement based on error correction, and so forth. It follows that not all routes including the same number of nodes are shortest.

In light of the above, in the illustrative embodiment, the quality monitors 18 and 28 follow the optical input amplifiers 16 and 26, respectively, and output the quality signals 18b and 28b representative of the transmission quality of the associated paths. The monitor/control unit 44 improves error correction in response to the quality signals 16 and 26, thereby providing information with durability. How the monitor/control unit 44 improves a coding gain and thereby provides information with durability will be described hereinafter.

The monitor/control unit 44 feeds the quality signals 18B and 28B derived from the quality signals 18b and 28b, respectively, to the inner-ring converting circuits 442a and 442b and outer-ring converting circuits 442c and 442d, respectively. The converting circuits 442a and 442c each read a bit error rate out of the bit error conversion table assigned to the FEC ON status. The converting sections 442a and 442c then deliver the respective bit error rates 52a and 52c to the selectors 444a and 444b, respectively. Likewise, the converting circuits 442b and 442d each read a bit error rate out of the bit error conversion table assigned to the FEC OFF status. The converting circuits 442b and 442d then deliver the respective bit error rates 52b and 52d to the selectors 444a and 444b, respectively. The monitor/control IF 440 feeds the control signals 44B and 44A representative of the FEC ON/OFF status each to the selectors 444a and 444b, respectively.

The estimation value comparing circuit 446 compares the bit error rates 54a and 54b selected by the selectors 444a and 444b and selects one of the transfer paths having a smaller bit error rate than the other. The comparing circuit 446 then generates a metric value "1" for the path selected and delivers the metric value "1" to the metric adding circuit 448.

The data storage 450 reads path information out of its routing table and feeds them to the same metric determining circuit 452. The same metric determining circuit 452 determines whether or not the path information include a plurality of identical metric values (cost values) each being assigned to a particular transmission path. If the answer of this decision is positive, then the determining circuit 452 reports the same metric values 58 to the metric adding circuit 448. If the answer of the above decision is negative, then the determining circuit 452 reports the smallest one of the metric values 62 to the data storage 450.

The metric adding circuit 448 adds the metric value "1" fed from the estimation value comparing circuit 446 to the same metric value, if present, fed from the same metric determining circuit 452. The metric adding circuit 448 then reports the resulting sum metric value 60 to the data storage 450.

The data storage 450 updates its routing table with the sum metric value 60 or the metric value 62 in accordance with a routing protocol. The data storage 450 then delivers routing information 64 representative of a route for optical transmission to the monitor/control IF 440. The monitor/control IF 440 converts the routing information 64 to switching information 44c and then feeds it to the path selecting section 38. Even when the inner ring 12 and outer ring 14 include the same number of hops, the switching information 44c allows the path selecting section 38 to select one of the paths higher in transfer quality than the other in consideration of the actual transfer conditions.

In the illustrative embodiment, the estimation comparing circuit 446 compares bit error rates determined in accordance with the ON/OFF statuses of the FEC Codecs each being assigned to a particular path. If desired, the bit error rates may, of course, be replaced with any other suitable estimation values that allow the transfer conditions of the individual path to be totally estimated.

As stated above, in the illustrative embodiment, the monitor/control unit 44 generates bit error rates representative of transmission quality path by path in response to quality signals, which are output from the quality monitors 18 and 28. The monitor/control unit 44 converts the bit error rates to path-by-path bit error rates relating to the FEC ON state and FEC OFF state. The monitor/control unit 44 then selects a path having a smaller bit error rate, assigns a new metric value to the path selected, and adds the new metric value to one of identical metric values assigned to the above path. The monitor/control unit 44 uses the resulting sum metric value to select a route in accordance with a routing protocol, thereby selecting a path in consideration of transmission quality. The illustrative embodiment can therefore increase a coding gain and therefore the durability of information by taking account of a transmission ability. This realizes optimal path selection closer to actual transfer conditions than the conventional path selection relying on the number of hops.

The entire disclosure of Japanese patent application No. 2001-56266 filed on Mar. 1, 2001, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. An optical transmission apparatus for selecting, based on a first metric representative of a criterion for decision, an optical transmission route to a desired destination on a network for thereby transmitting information to said desired destination, said apparatus comprising:

a plurality of quality monitors each for monitoring quality of a signal, which carries the information and arrives on a particular optical transmission path, immediately before said signal is input;

a monitor/control unit for converting first data being monitored to second data in accordance with conditions of each optical transmission path, comparing said second data selectively fed to said monitor/control unit path by path to thereby select a route, generating a second metric for said route selected, adding said second metric to the first metric of, among a plurality of optical transmission paths having a same metric value, an optical transmission path corresponding to said route selected to thereby control delivery of information, and controlling an error correcting function relating to said optical transmission path; and a route selecting circuit for selecting one of signals fed thereto in accordance with control over the error correcting function.

2. The apparatus in accordance with claim 1, wherein said plurality of quality monitors each calculate either one of an OSNR (Optical Signal-to-Noise Ratio) and a Q factor to thereby output the first data.

3. The apparatus in accordance with claim 2, wherein the second data each are representative of a particular bit error rate.

4. The apparatus in accordance with claim 3, wherein said monitor/control unit comprises:

a plurality of first converting circuits each for directly outputting, when converting the first data of a particular transmission path to the second data, said first data as third data;

a plurality of second converting circuits each for converting the first data of a particular path to the second data while executing error correction with said first data to thereby output fourth data;

a plurality of selectors each being assigned to a particular path for selecting either one of the third data and the fourth data of said particular path;

a metric generating circuit for comparing the third data and the fourth data selected by said plurality of selectors and generating the second metric for a path selected in accordance with a result of comparison;

a data storage storing routing information indicative of routes to the destination in accordance with a preselected rule;

a metric determining circuit for reading an optimal route to the destination out of said data storage and determining metrics having a same first metric value;

a metric adding circuit for adding said second metric to said first metric of, among the metrics having the same first metric value, the metric corresponding to the path selected to thereby output a third metric;

a control interface for controlling the error correcting function path by path and said plurality of selectors while outputting, based on said routing information, switching information for switching said route selecting circuit, and feeding the first data to a corresponding path.

5. The apparatus in accordance with claim 1, wherein the second data each are representative of a particular bit error rate.

6. A method of determining an optimal route for optical transmission by selecting, based on a first metric representative of a criterion for decision, an optical transmission route to a desired destination on a network for thereby transmitting information to said desired destination, said method comprising the steps of:

monitoring quality of a signal, which carries the information and arrives on a particular optical transmission path, immediately before said signal is input to thereby output first data being monitored;

directly outputting, when converting the first data output path by path to second data representative of a transmission ability, the signal input as third data;

executing, when converting the first data output path by path to the second data, error correction with the signal input to thereby output fourth data;

selecting either one of the third data and the fourth data output path by path in accordance with control over a path-by-path error correcting function;

comparing the third data and the fourth data selected, selecting a route in accordance with a result of comparison, and generating a second metric for said route;

determining, when reading an optimal route to the destination out of routing information preselected in accordance with a preselected rule, metrics having a same first metric value;

adding, when metrics having a same first metric value exist, the first metric corresponding to the path selected to the second metric to thereby output a third metric; and generating switching information for switching the path in response to the routing information corresponding to the third metric, and controlling an error correcting function path by path.

7. The method as claimed in claim 6, wherein the second data comprises a bit error rate.

* * * * *